__United States Patent__ [19]

Bollenrath et al.

[11] Patent Number: 4,822,869

[45] Date of Patent: * Apr. 18, 1989

[54] PROCESS FOR INTRODUCING GASES INTO LIQUIDS IN THE PRODUCTION OF POLYPHENYLENE ETHERS OR SULFOXIDIZED PARRAFINS USING HORIZONTAL REACTORS

[75] Inventors: Franz-Michael Bollenrath, Marl; Martin Bartmann, Recklinghausen; Bernhard Hentschel, Marl, all of Fed. Rep. of Germany

[73] Assignee: Chemische Werke Huls Aktiengesellschaft, Marl, Fed. Rep. of Germany

[*] Notice: The portion of the term of this patent subsequent to Jun. 7, 2005 has been disclaimed.

[21] Appl. No.: 907,177

[22] Filed: Sep. 16, 1986

Related U.S. Application Data

[63] Continuation of Ser. No. 700,027, Feb. 11, 1985, abandoned.

[30] Foreign Application Priority Data

Feb. 17, 1984 [DE] Fed. Rep. of Germany ....... 3405629

[51] Int. Cl.$^4$ .................... C08G 65/00; C08G 75/00
[52] U.S. Cl. ...................................... 528/216; 261/92; 261/93; 366/102; 366/103; 366/104; 528/212; 528/215; 526/64; 568/27

[58] Field of Search .................. 261/92, 93; 366/102–104; 528/216, 212, 215; 568/27; 526/64

[56] References Cited

U.S. PATENT DOCUMENTS

| | | | |
|---|---|---|---|
| 206,736 | 8/1878 | Kirkham et al. | 261/92 |
| 1,502,004 | 7/1922 | Akins et al. | 261/92 |
| 2,992,182 | 7/1961 | Elzinga et al. | 366/102 X |
| 3,306,875 | 2/1967 | Hay | 528/216 |
| 3,348,829 | 10/1967 | Grimes | 261/92 X |
| 3,498,754 | 3/1970 | Yamashita et al. | 422/135 |
| 3,522,018 | 7/1970 | Bachmann et al. | 261/92 X |
| 3,617,225 | 11/1971 | Kuehne et al. | 422/135 X |
| 4,401,606 | 8/1983 | Matsuoka | 261/93 |
| 4,404,359 | 9/1983 | Naarmann et al. | 528/216 |

Primary Examiner—John Kight
Assistant Examiner—Frederick Krass
Attorney, Agent, or Firm—Oblon, Fisher, Spivak, McClelland & Maier

[57] ABSTRACT

A method for introducing gases into liquids, wherein a stirred kettle is used which has the form of a cylindrical vessel in which the length/diameter ratio should be at least 1; and wherein the stirred kettle is filled to a level of more than 70% with the liquid into which gas is to be introduced, the gas feed rate is adapted to the absorption capacity of the liquid, and the stirrer speed is adjusted such that the largest coherent amount of gas is 10% of the volume of the stirred kettle.

8 Claims, 1 Drawing Sheet

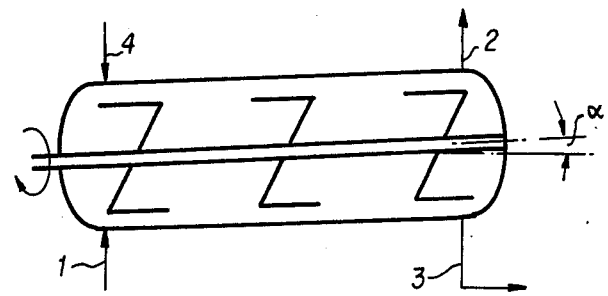
FIG. 1A  FIG. 1B
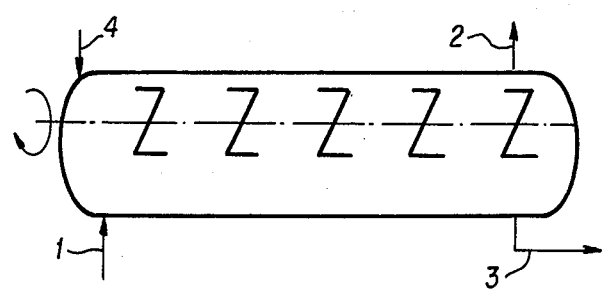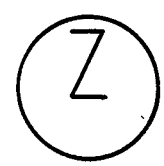
FIG. 2A  FIG. 2B
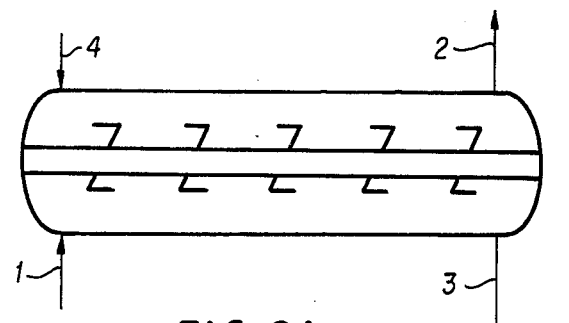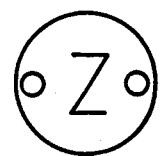
FIG. 3A  FIG. 3B PROCESS FOR INTRODUCING GASES INTO LIQUIDS IN THE PRODUCTION OF POLYPHENYLENE ETHERS OR SULFOXIDIZED PARRAFINS USING HORIZONTAL REACTORS This application is a continuation of application Ser. No. 700,027, filed Feb. 11, 1986, now abandoned.

BACKGROUND OF THE INVENTION

1. Field of the Invention

The invention relates to a process for introducing gases into liquids, in particular for contacting gaseous and liquid reactants, and to the use of an apparatus for carrying out this process.

2. Description of the Prior Art

In a number of processes, the problem arises of introducing gases into a liquid, either in order to disperse a gas in a liquid or to dissolve it, or in order to effect a chemical reaction between a gaseous reactant and a liquid reactant.

If a gas, say, is then passed through the liquid, the gas is quantitatively absorbed by the liquid only in the case of a high reaction rate and a small mass transfer resistance. In all other cases, only a more or less small proportion of the gas is absorbed by the liquid. The residual part of the gas remains unutilized.

This is unsatisfactory because the gases used frequently just be prepared at considerable cost.

If, for instance, toxic gases, such as hydrogen cyanide or carbon monoxide are used, an expensive destruction or reprocessing is indispensable. Difficulties arise also in the cases where the liquid tends to foam under the action of gases.

When air, oxygen or ozone are used for the oxidation of organic substances, the formation of highly explosive exit gas mixtures must be expected. An example of this is the oxidative coupling reaction of 2,6-disubstituted phenols. In such cases, a considerable expenditure on safety engineering is necessary in order to ensure that the reaction can proceed without hazard. Thus, for example, air saturated with toluene is explosive in the range from about 4° to 42° C.

Numerous types of apparatus are known from the state of the art, which make intimate contact of a gas with a liquid possible, for example in Ullmanns Encyklopadie der technischen Chemie [Ullmann's Encyclopaedia of Industrial Chemistry], 4th edition, volume 1, pages 225 et seq., (in particular pages 226 and 227), volume 2, pages 275 et seq., and volume 3, pages 357 et seq. (in particular page 359). These are plate columns and packed columns, spray devices, nozzles and stirred kettles which, in addition to different types of agitator, can contain various further inserts. However, the processes working with such types of equipment fundamentally suffer from the disadvantages described.

European Published specification No. 0,087,670 describes a process for avoiding an explosive gas phase in a vertical gas/liquid reactor with an enveloping tube, closed at the top, and nozzles, through which liquid jets are intended to emerge. This process appears to be involved, since the desired gas can be introduced into the reactor only after inert gas has been admitted first and has been so completely dispersed in the liquid that a relatively large coherent gas space is not longer present.

This process has two further disadvantages:

1. The measure of forcing a liquid through nozzles and thus achieving thorough mixing cannot be satisfactorily carried out if the liquid drawn in contains considerable quantities of dissolved gas constituents.

2. As is known, the dispersion of gases by means of jet nozzles requires a high energy consumption.

There are comparatively few processes which utilise horizontally disposed reactors.

In a number of scientific investigations (Ando et al., Journal of Chemical Engineering of Japan 5, 193 (1972); Aldo et al., Int. Chemical Engineering 11, 735 (1971) and Ando et al., AIChE 27, 599 (1981)), the influence of individual apparatus characteristics on the gas absorption and the stirrer power consumption in horizontally disposed reactors was investigated. In these experiments, the fraction of the gaseous phase always remains markedly above 30% of the reactor volume and the reaction mixture is thus inhomogeneous. This manifests itself in a non-uniform power consumption by the stirrer.

SUMMARY OF THE INVENTION

It was an object of the present invention to develop a process for introducing gas into a liquid, in which a separate coherent gas and liquid space in the reactor is avoided. Instead, homogeneous thorough mixing with the smallest possible power input to the stirrer was to be achieved.

It was an object of a preferred embodiment of the invention to avoid the reprocessing or circulation of toxic or explosive gases or gas mixtures.

It has now been found, surprisingly, that this is achieved when one (or more) horizontally disposed stirred kettle(s) is or are used and the introduction of the gas is carried out in the following way:

1. The stirred kettle is filled up to a level of more than 70% with the liquid into which gas is to be introduced.
2. The gas feed rate is adapted to the gas absorption capacity of the liquid.
3. The stirrer speed is adjusted such that the largest coherent gas volume amounts, as a maximum, to 10% of the volume of the stirred kettle.

Further preferred embodiments are the subject of the dependent claims.

DETAILED DESCRIPTION OF THE PREFERRED EMBODIMENTS

The invention also comprises the use of the stirred kettles, described in more detail below, and the application in the oxidative coupling of 2,6-dialkylphenols and in the sulphoxidation of paraffins.

The shape of stirred kettle is substantially that of a cylindrical vessel in which the length/diameter ratio is preferably greater than 1. The cross-section of the cylinder is preferably circular. Minor deviations from this preferred embodiment are possible. The size of the kettle is not critical. The stirred kettle should be disposed horizontally, but slight deviations from this disposition are also possible without imparing the inventive effect. Advantageously, the stirrer shaft is disposed axially or at least coaxially. However, slight deviations are possible even here.

In principle, any known stirrer types can be used, in the kettle (see Uhl, "Gray mixing", volume I, page 19, (1966)). Disc stirrers, bar stirrers, grid stirrers, pitched blade stirrers and multi-stage impulse counter-current (MIG) stirrers as well as Pfaudler-type stirrers have proved to be suitable in particular. Whereas the conventional gas introduction reactors have flow-directing inserts, which are intended to improve the dispersion of the gas in the liquid, the stirred kettle in the present process preferably manages precisely without such additional inserts which considerably increase the power input to the stirrer.

Initially, the kettle is filled with the liquid. If no foreign gases should be present, the reactor can be evacuated beforehand, if desired. The gas can be fed in either before or after the introduction of the liquid. The gas inlet branch and the liquid feed line can be fitted at any desired point of the reactor.

It can be desirable to introduce the gas continuously and, where possible, to create within the stirred kettle a quasi-steady state in which the degree of absorption of the gas within the stirred kettle increases steadily from one side to the other. In such a case, the gas is expediently introduced from that side at which the liquid loaded with gas leaves the kettle. By means of suitable selection of stirrers, a plug-type longitudinal flow in co-current and counter-current flow can be obtained (compare Journal of Chemical Engineering of Japan 8, 472–476, (1975)). It is then possible to withdraw a part stream of the liquid, to which gas has been added only to a defined predetermined extent. If a gas is employed which reacts with the liquid, with the formation of a reaction product which is not gaseous, the process can be controlled in such a way that no exit gas at all arises. Nevertheless, it can be advantageous even in this case to stop the conversion after a certain degree of conversion and to remove small quantities of exit gas. There are various possibilities for adapting the gas feed to the absorption capacity of the liquid, for example by measuring the reaction temperature or the conversion.

The gas can also be fed from a stock vessel which contains precisely the required quantity of gas. If it should be necessary for any reasons, either the introduction of gas itself or only the gas feed can be interrupted at any time.

The largest coherent gas volume should not exceed a maximum of 10%, or better 2%, of the volume of the stirred kettle. It is desirable that, even in large kettles, a gas bubble of 10 cm diameter represents the largest coherent gas volume. The optimum stirrer speed for achieving this cannot be given in general terms. It depends, inter alia, on the type of the liquid and the gas, on the absorption capacity of the liquid, on the size and the dimensions of the stirred kettle and especially on the type of the stirrer. However, an expert is able to determine the optimum stirrer speed in a few preliminary trials.

The introduction of gas can also be carried out in two or more stirred kettles arranged in series or in parallel.

The introduction of gas is normally carried out under atmospheric pressure. If the solubility of the gas in the liquid is low, it can also be advantageous to operate under an elevated pressure. Compared with the processes known from the state of the art, the present process has a number of advantages:

1. It is possible to distribute the entire quantity of gas required in the liquid over a period of any desired length.
2. In spite of the kettle being filled with only 70% of liquid, it is astonishing that states of flooding, which would cause a collapse of the introduction of gas, do not arise.
3. Relatively large coherent interfaces between gas and liquid are avoided.
4. It is possible to obtain any desired predetermined conversion in a chemical reaction.
5. The stirred kettle manages without flow-directing inserts which would lead to an increased power consumption by the stirrer.
6. Due to the uniform distribution of the gas in the liquid, stirring proceeds extremely quietly, with low power input.
7. At a correctly selected stirrer speed, relatively large gas spaces, which could increase the explosion risk, in particular in the vicinity of the hot stirrer shaft, are not formed.
8. Higher space/time yields can be achieved by means of the process.
9. The process is distinguished by simplicity and by high reliability and safety from explosions.

The process according to the invention is superior to the known processes according to the state of the art above all whenever a gaseous component dissolves only very slowly in a liquid.

The following may be mentioned here as examples:

1. The oxidative coupling of phenols, disubstituted in the ortho-position, to give polyphenylene ethers (compare, for example, B. Bühler, "Spezialplaste [Special Plastics]", Akademieverlag 1978, German Offenlegungsschrift No. 3,224,692).
2. The sulphoxidation of paraffins by the light/water process in accordance with the following simplified reaction equation

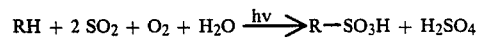

(compare Ullmanns Encyklopädie der technischen Chemie, [Ullmann's Encyclopaedia of Industrial Chemistry], 4th edition, volume 22, pages 478 et seq., 1982).

BRIEF DESCRIPTION OF THE DRAWINGS

FIGS. 1 and 2 show two embodiments of the reactors according to the invention.

FIG. 1A shows a stirred kettle, inclined by the angle α from the horizontal position and having a shaft passing through, in a diagrammatic sectional view 1B. It would be possible, for example, to feed reaction gas at point 1, to feed reaction liquid at point 4 and to withdraw reaction product at point 2. Item 2 could be used as a degassing branch.

FIG. 2A shows a similar reactor with an eccentric stirrer shaft and a diagramatic sectional view, 2B.

FIG. 3 shows another embodiment of the reactor which is not inclined.

FIG. 3A shows another similar reactor and a diagramatic sectional view, 3B.

EXAMPLES

Example 1

Discontinuous polymerisation of 2,6-dimethylphenol to polyphenylene ether. Catalyst preparation:

7.8 g of $CuCO_3 \cdot Cu(OH)_2$ are dissolved in 23 g of 48% hydrobromic acid, and the homogeneous solution obtained is added to 120 g of morpholine, with stirring.

126 g of the catalyst solution, 4,140 g of toluene, 659 g of methanol and 955 g of a 50% solution of 2,6-dimethylphenol in toluene are initially introduced into a reactor of 5 litre capacity. 19.7 g of oxygen are then introduced within 1 hour. The reactor is stirred by means of a paddle stirrer at speed of 300 min$^{-1}$. No gas is removed. Subsequently, the reaction is stopped in the conventional manner by addition of acetic acid (compare, for example, patent application No. P 33 13 864.8).

EXAMPLE 2

Continuous polymerisation of 2,6-dimethylphenol to polyphenylene ether.

1.17 kg/hour of a reaction solution, consisting of 25 g of catalyst solution according to Example 1, 828 g of toluene, 132 g of methanol and 191 g of a 50% solution of 2,6-dimethylphenol in toluene as well as 3.94 g of oxygen are continuously introduced into a stirred kettle cascade consisting of 3 reactors of 5 litre capacity each, according to FIG. 1. Simultaneously, 1.17 kg of reaction solution containing polyphenylene ether are continuously withdrawn from the reactor. The reactors are always filled with the reaction solution up to a level of more than 70%. The average residence time in the stirred kettle cascade is 45 to 90 minutes.

EXAMPLE 3

Sulphoxidation by the light/water process.

Water and fresh paraffin, on the one hand, and SO$_2$ and O$_2$, on the other hand, are introduced continuously into a reactor, as described under FIG. 1, fitted with several high-pressure mercury burners and having a total volume of 280 litres. The mixture leaving the reactor consists of 25 parts of paraffin and one part of an aqueous phase. This mixture is fed to a separator. There is no circulating gas stream. No exit gas is formed.

We claim:

1. In a method for producing polyphenyl ethers, wherein 2,6-dialkylphenols are oxidatively coupled, or a method for sulfoxidation of paraffins by the light/water process, the improvement which comprises:
    carrying out the coupling in at least one horizontally disposed stirred kettle by way of a method which comprises:
    adding to said stirred kettle up to a level of at least 80-90% of its capacity a liquid into which gas is to be introduced,
    supplying gas, in the form of bubbles, to said liquid at a rate adapted to the gas absorption capacity of said liquid, and
    stirring said liquid, while supplying said gas, such that the maximum coherent volume of said gas is 2% of the volume of said stirred kettle, wherein said liquid and gas form a substantially homogeneous mixture with said gas dispersed in said liquid so that relatively large coherent interfaces between gas and liquid are avoided to thereby reduce chances of an explosion.

2. A method according to claim 1, wherein said method is for producing polyphenyl ethers in which 2,6-dialkylphenols are oxidatively coupled, wherein said liquid into which gas is to be introduced is a solution of a 2,6-dialkylphenol and an organic solvent and said gas is oxygen or gas mixtures containing oxygen, and said solution further contains a copper/amine catalyst.

3. A method according to claim 2, wherein said mixture further contains an activator.

4. A method according to claim 1, wherein said method is for sulfoxidation of paraffins by the light/water process, wherein said liquid into which gas is to be introduced is a mixture of paraffin and water and said gas is a mixture of sulfur dioxide and oxygen.

5. The method of claim 1, wherein said stirring is carried out by a disc stirrer, a bar stirrer, a grid stirrer, a pitched blade stirrer, a multi-stage impulse countercurrent (MIG) stirrer or a Pfaudler-type stirrer.

6. The method according to claim 1, wherein a gas bubble having a diameter of 10 cm represents the largest coherent volume of said gas.

7. The method according to claim 1, wherein introduction of gas is carried out continuously.

8. The method of claim 1, wherein said horizontally disposed stirred kettle is a cylindrical vessel having a ratio of length to diameter of at least 1 and which includes an axial or coaxial stirring shaft.

* * * * *

UNITED STATES PATENT AND TRADEMARK OFFICE
CERTIFICATE OF CORRECTION

PATENT NO. : 4,822,869

DATED : 04/18/89

INVENTOR(S) : BOLLENRATH et al.

It is certified that error appears in the above-identified patent and that said Letters Patent is hereby corrected as shown below:

In the title: "parrafins" should be "paraffins"
Col. 5, Line 37: "polyphenyl ethers" should be "polyphenylene ethers"
Col. 6, Line 16: "polyphenyl ethers" should be "polyphenylene ethers"

Signed and Sealed this

Tenth Day of July, 1990

Attest:

HARRY F. MANBECK, JR.

*Attesting Officer*  *Commissioner of Patents and Trademarks*